United States Patent
Akita et al.

(10) Patent No.: US 6,882,545 B2
(45) Date of Patent: Apr. 19, 2005

(54) NONCONTACT ID CARD AND METHOD OF MANUFACTURING THE SAME

(75) Inventors: Masanori Akita, Otsu (JP); Yoshiki Sawaki, Otsu (JP)

(73) Assignee: Toray Engineering Company, Limited, Osaka (JP)

(*) Notice: Subject to any disclaimer, the term of this patent is extended or adjusted under 35 U.S.C. 154(b) by 42 days.

(21) Appl. No.: 10/386,616

(22) Filed: Mar. 13, 2003

(65) Prior Publication Data

US 2004/0037053 A1 Feb. 26, 2004

(30) Foreign Application Priority Data

| Mar. 18, 2002 | (JP) | ........................................ | 2002-075112 |
| Jun. 26, 2002 | (JP) | ........................................ | 2002-186514 |

(51) Int. Cl.[7] ................................................. H05K 1/14
(52) U.S. Cl. ........................ 361/767; 361/768; 361/771; 361/782
(58) Field of Search ................................ 361/737, 767, 361/768, 771, 772–774, 782, 803

(56) References Cited

U.S. PATENT DOCUMENTS

| 5,606,488 | A | * | 2/1997 | Gustafson | ................... | 361/782 |
| 5,640,306 | A | * | 6/1997 | Gaumet et al. | ............. | 361/737 |
| 6,310,778 | B1 | * | 10/2001 | Finn et al. | ................... | 361/737 |
| 6,380,614 | B1 | * | 4/2002 | Higuchi et al. | ............. | 257/679 |
| 6,816,380 | B1 | * | 11/2004 | Credelle et al. | ............ | 361/736 |

FOREIGN PATENT DOCUMENTS

WO    WO-01/62517 A1    8/2001

* cited by examiner

*Primary Examiner*—John B. Vigushin
(74) *Attorney, Agent, or Firm*—Rader, Fishman & Grauer PLLC (57) ABSTRACT

A noncontact ID card composed by laminating an antenna circuit board where an antenna is formed and an interposer board formed by connecting an enlarged electrode to an electrode of a mounted IC chip and bonding between an antenna electrode of the antenna circuit board and the enlarged electrode of the interposer board with electroconductive adhesive material, wherein a substrate of the antenna circuit board and a substrate of the interposer board are bonded. In addition, in another composition, at least one local deformation is applied to a boding face of the electrodes each other in a direction crossing the bonding face.

6 Claims, 7 Drawing Sheets

NONCONTACT ID CARD AND METHOD OF MANUFACTURING THE SAME

BACKGROUND OF THE INVENTION

1. Field of the Invention

The present invention concerns a noncontact ID (identification information) card and a method of manufacturing of the same and, more particularly, a noncontact ID card in which the conduction state between both electrodes can be kept satisfactory for a prolonged period of time, even in case of bonding between an antenna electrode of an antenna circuit board and an enlarged electrode of an interposer board with electroconductive adhesive material, and a method of manufacturing of the same.

2. Detailed Description of the Prior Art

Conventionally, those on various forms are well known, as a noncontact ID card, a noncontact ID tag and so on mounting an IC chip on an antenna circuit board. As a representative example thereof, the International Publication (WO01/62517) can be cited, and the noncontact ID card disclosed in this document is a noncontact ID card in which an antenna circuit board where an antenna is formed and an interposer board formed by connecting an enlarged electrode to an electrode of an IC chip mounted thereof are laminated and, at the same time, an antenna electrode of the antenna circuit board and the enlarged electrode of the interposer board are bonded with electroconductive adhesive material.

However, the portion where both electrodes are bonded with the electroconductive adhesive material might come off under the effect of temperature, moisture and so on and it is extremely difficult to hold the bonding state in a conduction state of a constant electric resistance for a prolonged period of time. Especially, as the bonding part of both electrodes is minute in area, it has been difficult to resolve it so long as general commercialized electroconductive adhesive material is used.

Moreover, as for electroconductive adhesive material, those of paste form or film form containing a number of electroconductive particles in resin are used. When this electroconductive adhesive material is used for bonding between both electrodes, it is painted and dried on the electrode of the interposer board in case of paste form before bonding them, and sticked in case of film form. Next, this interposer board is laminated on the antenna circuit board, points where both electrodes are opposed are heated under the pressure by a heat tool, and both electrodes are bonded in a conduction state through heat sealing.

However, in the initial phase immediately after the start of heat sealing, as both electrodes are in an unstable temporary bonding state one to the other, a miss-alignment may occur between the bonding positions of both electrodes due to fluidity, elasticity and so on of the resin component of the electroconductive adhesive material. Then, if the flatness between both electrodes can be no more kept precise due to the dislocation of this bonding part, there is a problem that the electric resistance value of the bonding part changes, and thereby resulting in the production of defectives.

SUMMARY OF THE INVENTION

A main object of the present invention is to provide a noncontact ID card wherein the conduction state between both electrodes can be kept satisfactory for a prolonged period of time, even in case of bonding between an antenna electrode of an antenna circuit board and an enlarged electrode of an interposer board with electroconductive adhesive material, and a method of manufacturing of the same.

Another object of the present invention is to provide a noncontact ID card wherein the conduction state between both electrodes can be kept satisfactory for a prolonged period of time by making the bonding part hard to detach, even in case of bonding between an antenna electrode of an antenna circuit board and an enlarged electrode of an interposer board with electroconductive adhesive material, and a method of manufacturing of the same.

Still another object of the present invention is to provide a noncontact ID card wherein the conduction state between both electrodes can be kept satisfactory for a prolonged period of time by preventing a dislocation of their bonding part from occurring, even in case of bonding between an antenna electrode of an antenna circuit board and an enlarged electrode of an interposer board with electroconductive adhesive material, and a method of manufacturing of the same.

A noncontact ID card of the present invention for attaining the main object and the second object, among the aforementioned objects, is composed by laminating an antenna circuit board where an antenna is formed and an interposer board formed by connecting an enlarged electrode to an electrode of a mounted IC chip, bonding between an antenna electrode of the antenna circuit board and the enlarged electrode of the interposer board with electroconductive adhesive material and bonding between a substrate of the antenna circuit board and a substrate of the interposer board.

Moreover, a method of manufacturing of the aforementioned noncontact ID card comprises steps of laminating an antenna circuit board where an antenna is formed and an interposer board formed by connecting an enlarged electrode to an electrode of a mounted IC chip, bonding an antenna electrode of the antenna circuit board and the enlarged electrode of the interposer board with electroconductive adhesive material and bonding a substrate of the antenna circuit board and a substrate of the interposer board.

A stable electric resistance value can be kept for a prolonged period of time, without being influenced by the environmental change such as temperature, moisture, even in case of bonding between the antenna electrode of the antenna circuit board and the enlarged board of the interposer board with electroconductive adhesive material, because the antenna electrode of the antenna circuit board and the enlarged electrode of the interposer board are bonded with electroconductive adhesive material as mentioned above and, moreover, the substrate of the antenna circuit board and the substrate of the interposer board are bonded.

Moreover, a noncontact ID card of the present invention for attaining the aforementioned main object, second object and third object is composed by laminating an antenna circuit board where an antenna is formed and an interposer board formed by connecting an enlarged electrode to an electrode of a mounted IC chip, bonding between an antenna electrode of the antenna circuit board and the enlarged electrode of the interposer board with electroconductive adhesive material and applying at least one local deformation to a boding face of the electrodes each other in a direction crossing the bonding face.

Moreover, a method of manufacturing of the aforementioned noncontact ID card comprises steps of laminating an antenna circuit board where an antenna is formed and an interposer board formed by connecting an enlarged electrode to an electrode of a mounted IC chip, bonding an antenna electrode of the antenna circuit board and the enlarged electrode of the interposer board with electroconductive adhesive material and applying at least one local deformation to the antenna electrode and the enlarged electrode in a direction crossing opposite faces of both electrodes.

Thus, the application of local deformation to at least one place of the bonding face of both electrodes in a direction crossing the bonding face permits to prevent the bonding part from detaching and, at the same time, prevent a relative dislocation between both electrodes, and maintain satisfactory the conduction state between both electrodes for a prolonged period of time.

DESCRIPTION OF THE PREFERRED EMBODIMENTS

A noncontact ID card of the present invention is composed by laminating an antenna circuit board where an antenna is formed and an interposer board mounted with an IC chip and, at the same time, formed by connecting an enlarged electrode to an electrode of the IC chip, and bonding between an antenna electrode of the antenna circuit board and the enlarged electrode of the interposer board with electroconductive adhesive material. Now, the present invention shall be described referring to illustrated embodiments.

It should be appreciated that, in the present invention, "noncontact ID card" is used in a meaning including not only simply cards but also those used as card analogue such as tag. In addition, "electroconductive adhesive material" shall be used as generic of media boding two members and, except otherwise specified, used in a meaning including electroconductive sticky material.

Figure 1:
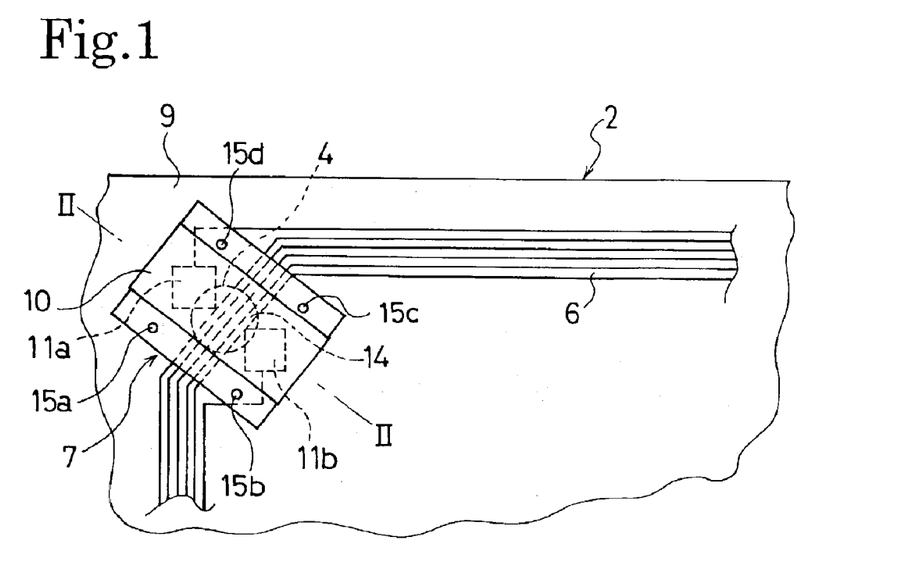
FIG. 1 is a plan view illustrating a noncontact ID card of the present invention.
Figure 2:
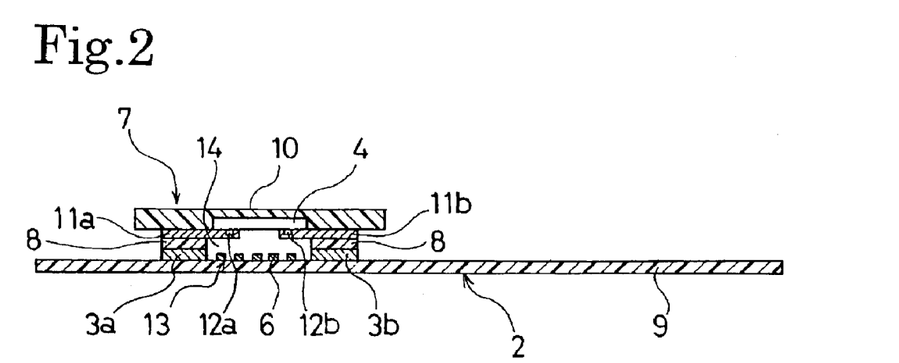
FIG. 2 is a II—II cross section of FIG. 1.
Figure 3:
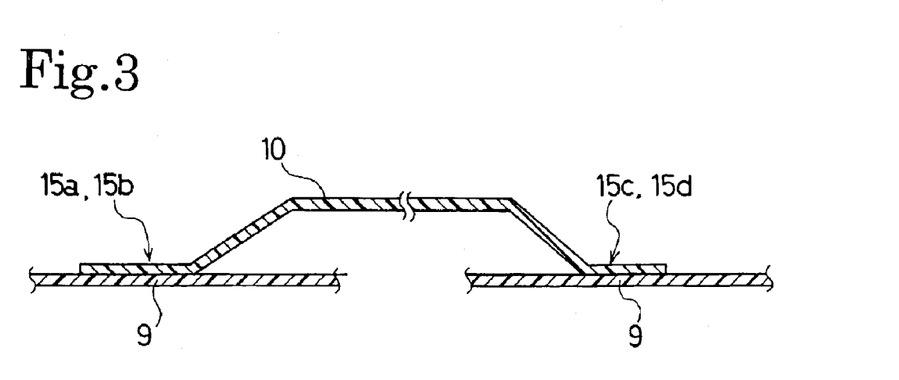
FIG. 3 is a longitudinal section showing a heat-welding mode of an interposer board in the noncontact ID card of FIG. 1.

In the noncontact ID card of the present invention shown in FIG. 1 and FIG. 2, 2 is an antenna circuit board disposed downside, and 7 is an interposer board laminated upside.

Figure 6:
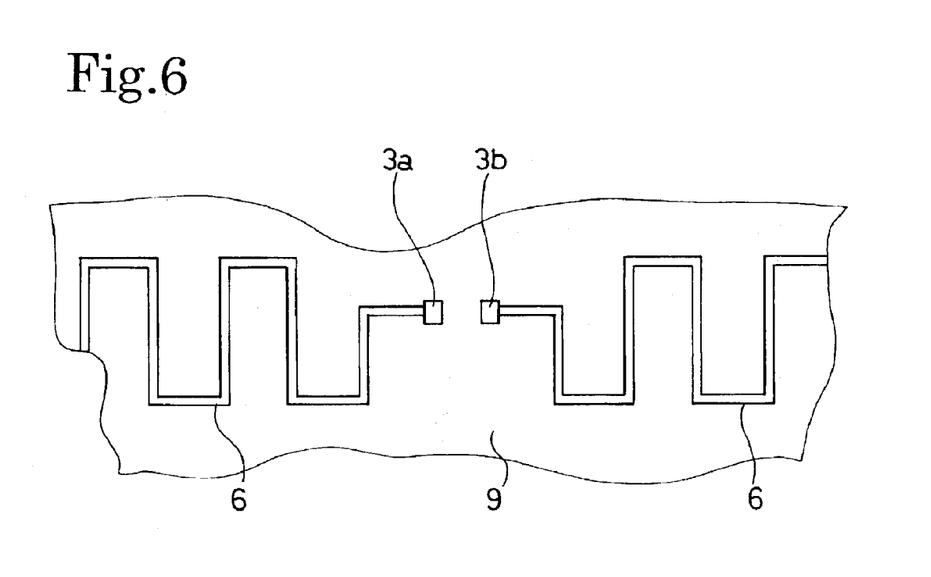
FIG. 6 is a plan view showing an antenna circuit board where a comb antenna is formed.

The antenna circuit board 2 has a substrate 9 composed of a thermoplastic resin film, an antenna 6 is formed on the surface of the substrate 9, and a pair of antenna electrodes 3a, 3b are connected on it. The antenna 6 in the antenna circuit board 2 is not particularly limited in the form, provided that it has the antenna function. For example, in addition to the linear form shown in FIG. 1, it may be a comb teeth form shown in FIG. 6, or a spiral type.

Figure 4:
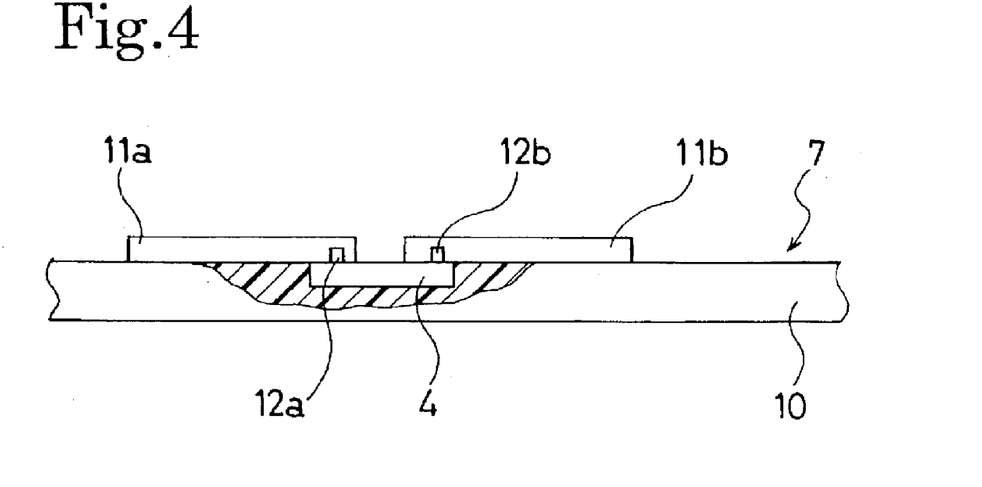
FIG. 4 is a side view of essential parts of the interposer board by a partial section.
Figure 5:
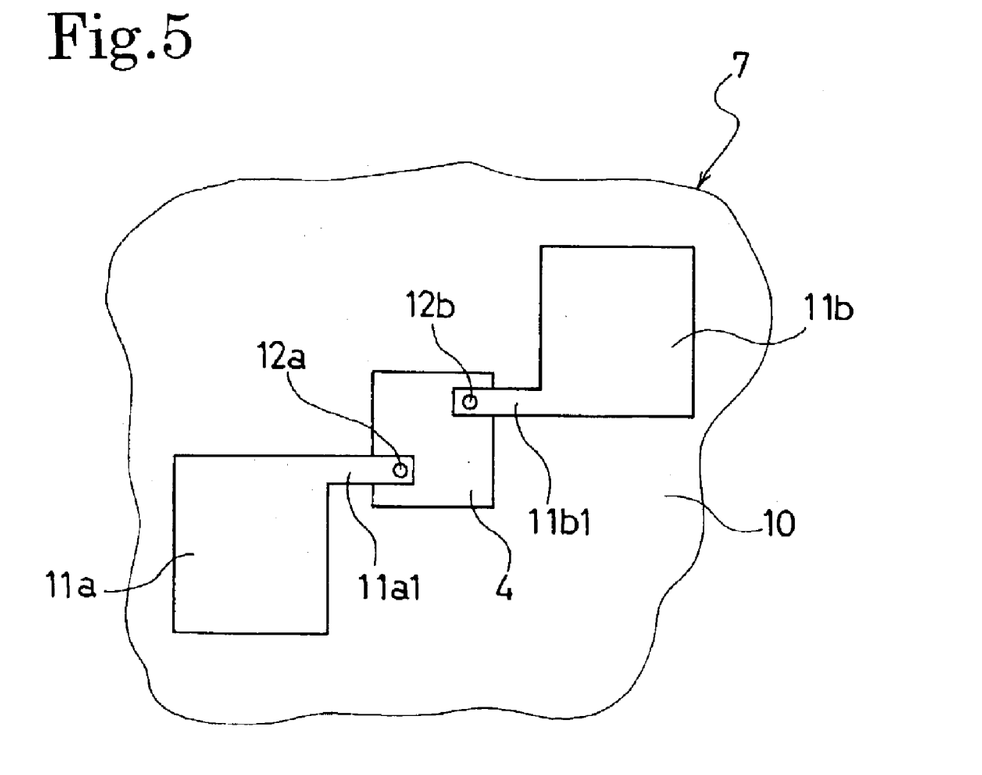
FIG. 5 is a plan view showing essential parts of the interposer board of FIG. 4.

The interposer board 7 is composed so that a substrate 10 is also composed of a thermoplastic resin film, an IC chip 4 is embedded in the substrate 10, and enlarged electrodes 11a, 11b are connected to a pair of electrodes 12a, 12b of the IC chip 4. The pair of electrodes 12a, 12b of the IC chip 4 embedded in the interposer board 7 are connected to the enlarged electrodes 11a, 11b through fine lead parts $11a_l$, $11b_l$, as shown in the enlarged view of FIG. 4 and FIG. 5.

For the antenna circuit board 2 and the interposer board 7 composed as mentioned above, the antenna electrodes 3a, 3b and the enlarged electrodes 11a, 11b are opposed one to the other and, at the same time, made electrically conductive by bonding them with electroconductive adhesive material 8. A gap 13 is formed between the mutually bonded antenna electrodes 3a, 3b and between the enlarged electrodes 11a, 11b, and this gap 13 is filled with insulating resin 14. Such filling with the insulation resin 14 allows to enhance the insulation of the electrode bonding part.

For the aforementioned noncontact ID card, furthermore, the substrate 9 of the antenna circuit board 2 and the substrate 10 of the interposer board 7 are bonded by a bonding part 15a to 15d. The bonding of the substrate 10 of the interposer board 7 and the substrate 9 of the antenna circuit board 2 allows to reinforce the bonding between the antenna electrodes 3a, 3b and enlarged electrodes 11a, 11b with the electroconductive adhesive material 8, enabling to maintain the conduction state between electrodes at a constant low electric resistance value for a prolonged period of time without being influenced by the temperature, moisture and so on.

The boding between the aforementioned substrates 9 and 10 may be spot form as bonding parts 15a to 15d, or linear. Besides, the bonding part between the substrates 9 and 10 is preferably positioned in the vicinity of the electrode bonding part of the antenna electrodes 3a, 3b and enlarged electrodes 11a, 11b. Such positioning in the periphery of the electrode bonding part allows to make the protection of the electrode bonding part satisfactory all the way improving the productivity.

Moreover, the bonding between the substrates 9 and 10 may be performed by either heat-welding or adhesive material. However, as the application operation is troublesome and inefficient in case of adhesive material, it is preferable to perform by heat-welding. In case of heat-welding, at least one of substrates 9 or 10 is composed of a thermoplastic resin film, but it is not limited to a case of composing only with a thermoplastic resin film, and may be laminated material using the thermoplastic film as base material and combining with paper, non-woven fabric and so on. These both substrates 9, 10 are pinched by a heat tool, and bonded by pressing and heating. Although, the heat tool to be used is not particularly limited, preferably, ultrasonic type heat tool, ceramic type heat tool and so on can be used.

As for thermoplastic resin to be used for the substrate 9, 10, in addition to copolymerization polyethylene terephthalate (PET-G), for example, polyethylene terephthalate (PET), polysulfone (PSF), polyethersulfone (PES), liquid crystal polymer (LCP), polyetherethylketone (PEEK) and so on can be cited.

The substrate 9, 10 may be composed of a non thermoplastic resin film, paper, non-woven fabric and so on that are hard to be welded by heat. In case where both of substrates 9, 10 are composed of a non thermoplastic resin film, paper, non-woven fabric and so on that are hard to be welded by heat, the substrates 9, 10 are bonded with adhesive material. In case of boding substrates 9, 10 with adhesive material also, the bonding part thereof may be spot form or linear similarly to the case of heat-welding. The adhesive material to be used may be either adhesion or stick, and may also be any of thermosetting type, non-thermosetting type, room temperature-setting type and so on.

Bonding faces for bonding between the antenna electrodes 3a, 3b and the enlarged electrodes 11a, 11b with electroconductive adhesive material 8 are preferably roughened respectively into a minute irregular surface. This is to allow the electroconductive adhesive material to adhere to it easily. The electroconductive adhesive material used for bonding may be any of paste form or film form. However, those of film form are preferably convenient, and particularly those of paste form are preferable in case of mass production. In case of using electroconductive adhesive material, in a paste form, it is applied on the electrode surface with printing or dripping and then dried into a film form. In case of using electroconductive adhesive material in a film form, it is pasted on the electrode surface as it is.

Many of film form electroconductive adhesive material are thermosetting adhesive material or PSA (pressure sensitive adhesive) sticky material, but some of them are thermoplastic. For example, there are those containing electroconductive particulates such as Ni, Ag or other metal particulates or metallic coating particulates in hot-melt type acrylic sticky resin and so on. In any case, the electrode bonding part is pressed and heated by a heat tool to bring electroconductive particulates into contact among them and with both electrodes and electrically into a conduction state. The heating temperature and the heating time for the electrode bonding are controlled to predetermined temperature and time responding to the characteristics of the electroconductive adhesive material. For example, in case of using a thermoplastic type electroconductive sticky film, the heating temperature and time are about 100° C. and several seconds.

As for the mounting of the IC chip 4 on the substrate 10 of the interposer board 7, in addition to the embedding as the illustrated example, for instance, it may be mounted in a way to laminate on the surface of the substrate. However, it is preferable to embed in view of thinning of the card.

The antenna electrode 3a, 3b and enlarged electrode 11a, 11b are composed of silver paste printing, or the one may be composed of a silver paste printed electrode, while the other of aluminum. Moreover, the material of the enlarged electrode 11a, 11b and antenna electrode 3a, 3b may be electroconductive resin and, furthermore, formed by printing methods such as screen printing or offset printing. Or, aluminum or the like may be deposited by spattering method and so on. For the electrode 12a, 12b of the IC chip 4, it is preferable to form an under barrier metal layer (UBM layer) in order to ensure the connection with the enlarged electrode 11a, 11b.

The method of manufacturing of the aforementioned noncontact ID card of the present invention comprises steps of laminating an antenna circuit board 2 where an antenna 6 is formed and an interposer board 7 formed by connecting enlarged electrodes 11a, 11b to electrodes 12a, 12b of a mounted IC chip 4, bonding an antenna electrode 3a, 3b of the antenna circuit board 2 and the enlarged electrode 11a, 11b of the interposer board 7 with electroconductive adhesive material 8 and bonding a substrate 9 of the antenna circuit board 2 and a substrate 10 of the interposer board 7. To be more specific, it is manufactured as follows.

First of all, an antenna circuit board 2 and an interposer board 7 made beforehand in the previous step are prepared. Here, the substrate 9 of the antenna circuit board 2 and the substrate 10 of the interposer board 7 shall be composed for instance of a thermoplastic resin film. Next, a paste like electroconductive adhesive material 8 is applied to or a film like electroconductive adhesive material 8 is stuck on the enlarged electrode 11a, 11b of the interposer board 7. It goes without saying that the electroconductive adhesive material 8 may be applied or stuck on the electrode 3a, 3b side of the antenna circuit board 2. Then, the interposer board 7 and the antenna circuit board 2 are laminated so that enlarged electrode 11a, 11b and the antenna electrode 3a, 3b are opposed up and down.

For the aforementioned laminating operation, the antenna circuit board 2 is sucked and held to a not shown lower stage, the interposer board 7 sucked and held above is moved to this antenna circuit board 2, the electrode 3a, 3b of the antenna circuit board 2 and the enlarged electrode 11a, 11b of the interposer board 7 are aligned in position in two axial directions (X, Y axial directions) orthogonal one to the other on the horizontal plane, before moving the heat tool for applying the electroconductive adhesive material 8 to the electrode 3a, 3b of the antenna circuit board 2 to heat-seal.

In addition, the substrate 10 of the interposer board 7 is heat-welded to the substrate 9 of the antenna circuit board 2, and this bonding operation may be performed at the same time as the mutual boding of the aforementioned electrodes, after the mutual bonding of the aforementioned electrodes, or before the mutual bonding of the aforementioned electrodes. However, from the viewpoint of preventing the dislocation of the electrode bonding part or improving the productivity, it is preferable to bond substrates each other before bonding between the electrodes. It is similar to the case where the bonding between substrates is executed by adhesive material instead of the heat-welding.

Besides, the bonding operation of substrates one to the other may use simultaneously the heat tool used for the mutual bonding of the electrodes or a heat tool set separately may also be used. In addition, the point to bond substrates is not particularly limited, but preferably it is preferable to bond in the vicinity of a portion where electrodes are bonded as bonding parts 15a to 15d illustrated in FIG. 1 for the protection of the electrode bonding part and the productivity.

Temperature and time in case of thermo-welding substrates each other may be decided according to the characteristics of the thermoplastic resin film used for the substrate. For example, in case where the material of the substrate is a film of copolymer polyethyleneterephthalate (PET-G), the temperature and time are about 120° C. and 0.5 to 2 seconds.

As substrates of the substrate 9 of the antenna circuit board 2 and the substrates 10 of the interposer board 7 are bonded each other as mentioned above, the method of manufacturing of the noncontact ID card of the present invention, a constant electric conduction state can be maintained for a prolonged period of time, even when electrodes 3a, 3b; 11a, 11b are bonded with the electroconductive adhesive material.

Figure 7:
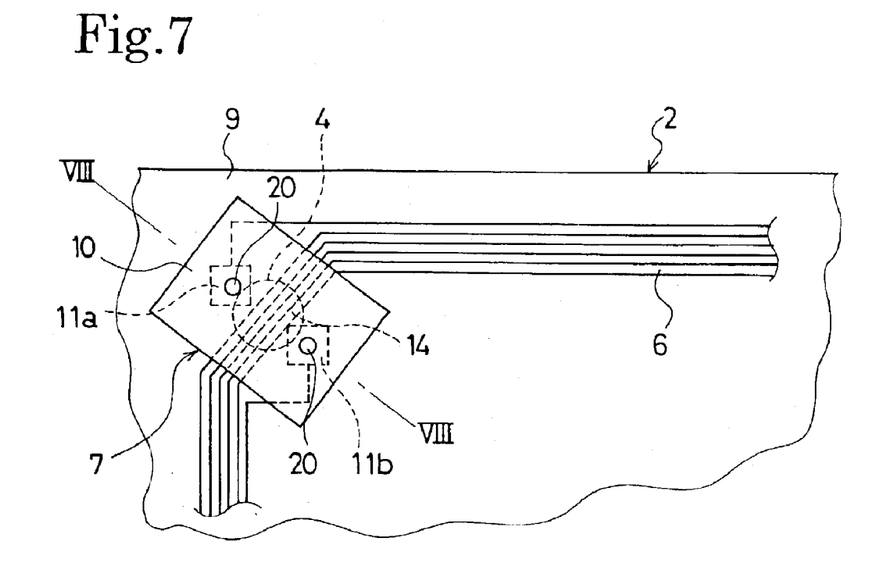
FIG. 7 is a plan view showing a noncontact ID card of another embodiment of the present invention.
Figure 8:
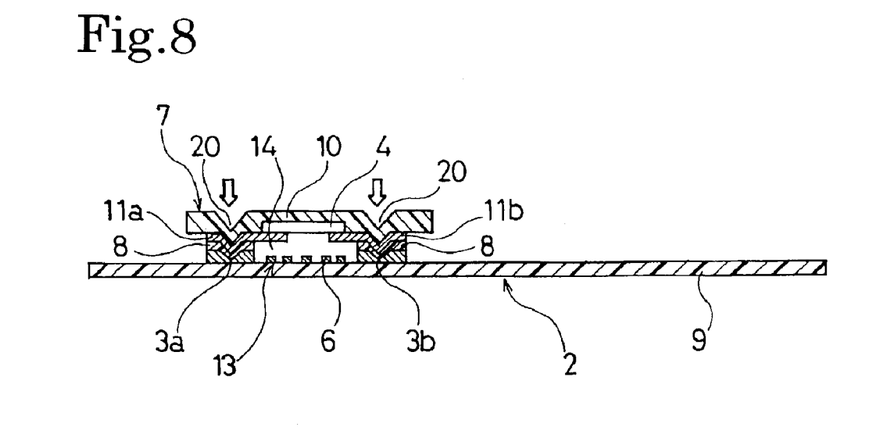
FIG. 8 is a VII—VII section of FIG. 7.
Figure 9:
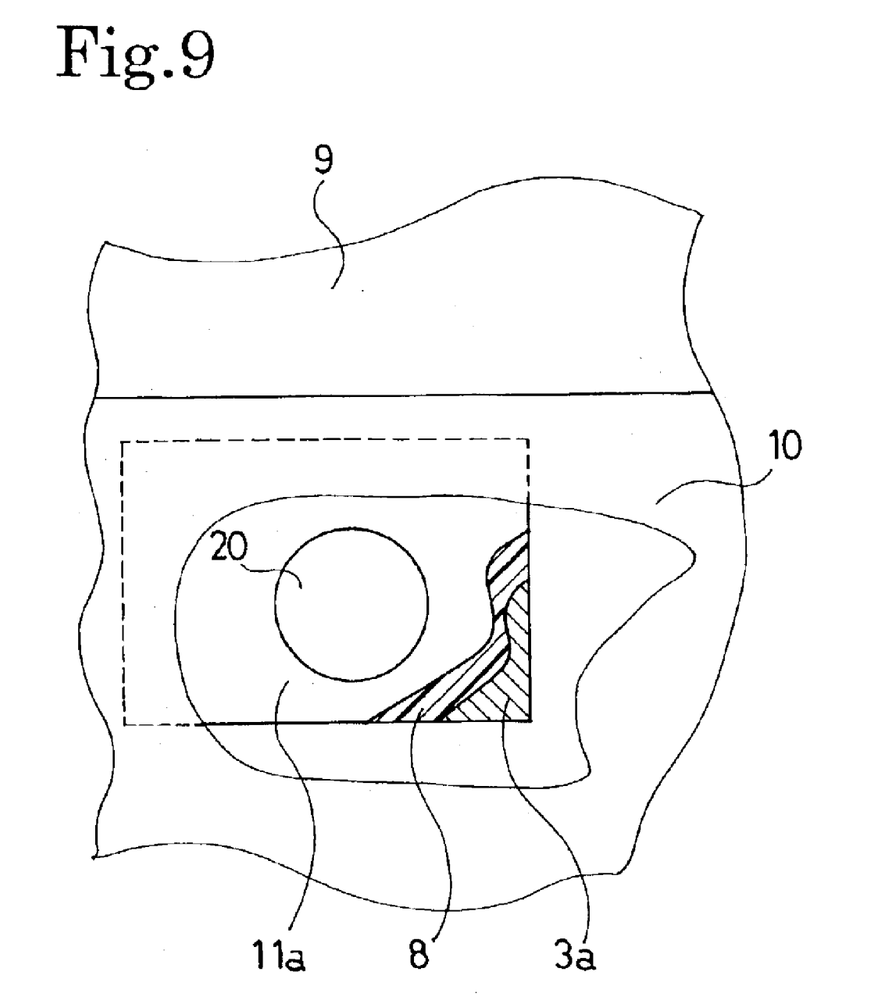
FIG. 9 is a plan view showing a deformation point of an electrode bonding part in FIG. 7 by a partial section.

FIG. 7 to FIG. 9 show other embodiments of the noncontact ID card of the present invention.

This noncontact ID card is same as the aforementioned embodiment of FIG. 1 and FIG. 2 in that the antenna circuit board 2 and the interposer board 7 are laminated, and the antenna electrode 3a, 3b of the antenna circuit board 2 and the enlarged electrode 11a, 11b of the interposer board 7 are bonded through the electroconductive adhesive material 8. The antenna circuit board 2 is formed by forming an antenna 6 in the substrate 9 composed of a resin film and connecting a pair of electrodes 3a, 3b to this antenna 6. Moreover, the interposer board 7 is formed by embedding an IC chip 4 in a substrate 10 composed of a thermoplastic film, and connecting an enlarged electrode 11a, 11b to a pair of electrode 12a, 12b of this IC chip. The substrate 9 of the antenna circuit board 2 and the substrate 10 of the interposer board 7 may be same as the case of the aforementioned FIG. 1 and FIG. 2. In short, the substrate 9, 10 may be a simple resin film or laminated material with the other materials such as paper, non-woven fabric, using the resin film as main material. The thermoplastic resin film is preferable as resin film. Furthermore, it may be a non-thermoplastic resin film, paper, non-woven fabric or the like hard to be heat-welded.

The electrodes 11a and 3a and the electrodes 3b and 11b bonded each other with the electroconductive adhesive material 8 as mentioned above have respectively a local portion 20 of one part is bent and deformed in the arrow direction orthogonal to the bonding face. A bending deformation being applied between both electrodes in such a way, the electrode bonding part is prevented from peeling off, both electrodes are prevented from dislocating, and the conduction state between both electrodes can be maintained satisfactory for a prolonged period of time.

Furthermore, it is not illustrated, but, in the noncontact ID card shown in FIG. 7 to FIG. 9, the substrate 10 of the interposer board 7 and the substrate 9 of the antenna circuit board 2 may be bonded by heat-welding or the like, as in the embodiment of FIG. 1 and FIG. 2. Thus, a satisfactory conduction state between electrodes can further be improved by adding a bonding composition between substrates.

The manufacturing of the noncontact ID card comprising the aforementioned composition can be executed by steps of laminating an antenna circuit board 2 where an antenna 6 is formed and an interposer board 7 formed by connecting an enlarged electrode 11a, 11b to an electrode 12a, 12b of a mounted IC chip 4, bonding an antenna electrode 3a, 3b of the antenna circuit board 2 and the enlarged electrode 11a, 11b of the interposer board 7 with electroconductive adhesive material 8 and applying a local deformation of at least one point to the antenna electrode 3a, 3b and the enlarged electrode 11a, 11b in a direction crossing the opposite faces of both electrodes.

As for the electrodes bonding step, similarly to the case of the embodiment(s) of FIG. 1 and FIG. 2 mentioned above, the electroconductive adhesive material may be interposed between the antenna electrode 3a, 3b and the enlarged electrode 11a, 11b, pressed and heated by a heat tool. This pressing and heating can bring electroconductive particulates in the electroconductive adhesive material 8 into contact and electrically conduction state. Concerning also the electroconductive adhesive material, those similar to the one used for the aforementioned embodiment can be used.

The electrodes deformation step can be executed, for instance, by forcing a molding tool such as punch into a predetermined depth in the arrow direction from above the substrate 10 of the interposer board 7. As for the electrodes deformation step, it is preferable to execute previously before the electrodes bonding step for heat sealing between both electrodes 3a, 3b; 11a, 11b with the electroconductive adhesive material 8. Thus, the execution of the electrodes deformation step before the electrodes bonding step allows to obtain a satisfactory bonding state without occurrence of dislocation in bonding position of both electrodes, even if the electrode bonding part is pressure heated in the following electrodes bonding step.

In general, when the aforementioned heat seal is performed, the dislocation in the bonding position of both electrodes tends to occur easily due to the effect of the resin component of the electroconductive adhesive material 8. Especially, it is remarkable in case of using electroconductive adhesive material. However, as the electrodes deformation step is performed before the electrodes bonding step, a local point 20 of a portion is bent and deformed between the enlarged electrode 11a, 11b and the antenna electrode 3a, 3b each other, and forced in the other one together with the electroconductive adhesive material 8 between both electrodes, it becomes possible not to produce the aforementioned bonding dislocation, in order to prevent a relative dislocation between both electrodes.

The electroconductive adhesive material used for the present invention may be paste form or film form, but those of film form are preferable for performing the aforementioned electrodes deformation step advantageously. However, even that electroconductive adhesive material of paste form can follow the forcing of the molding tool in the electrodes deformation step, as they are applied on the electrode surface, then dried and changed into the film form.

Figure 10:
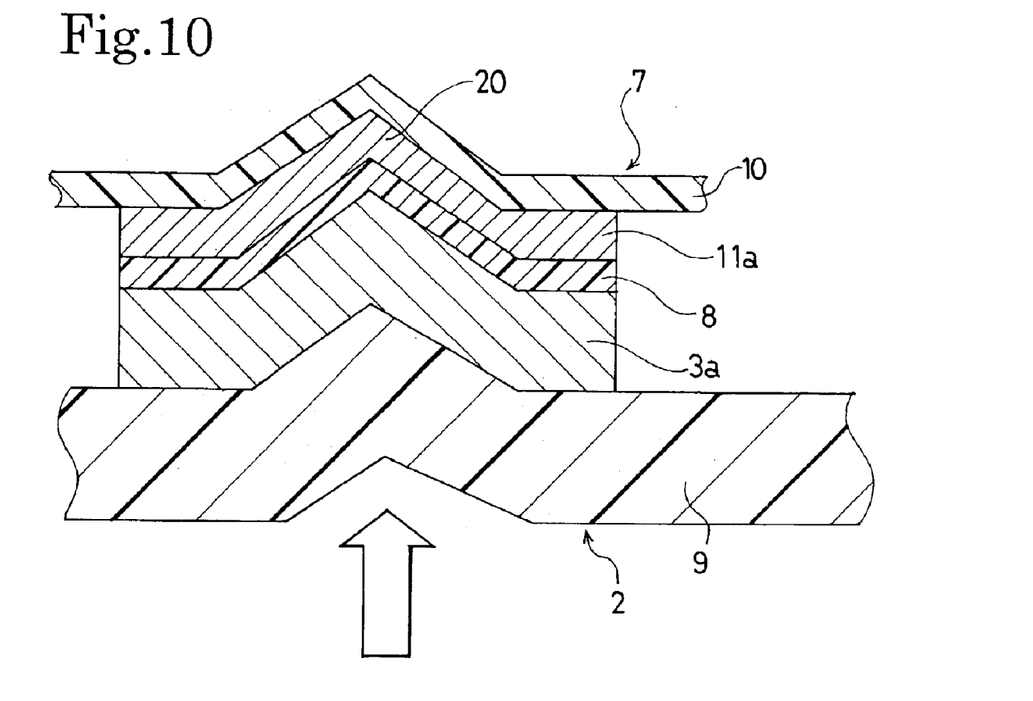
FIG. 10 is a vertical section showing another mode of the deformation point of an electrode bonding part.
Figure 11:
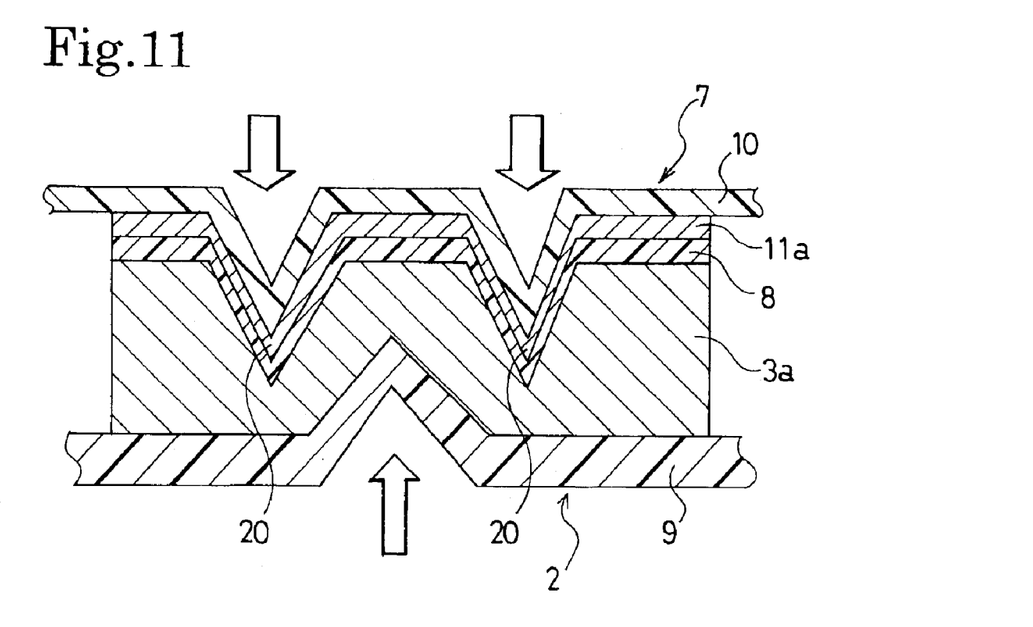
FIG. 11 is a vertical section showing still another mode of the deformation point of an electrode bonding part.
Figure 12:
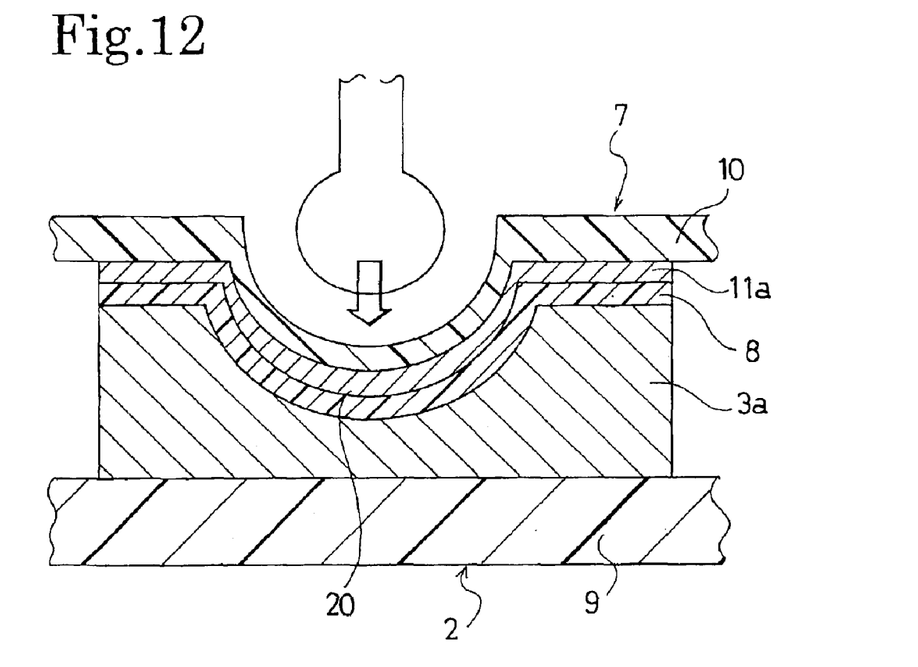
FIG. 12 is a vertical section showing still another mode of the deformation point of an electrode bonding part.
Figure 13:
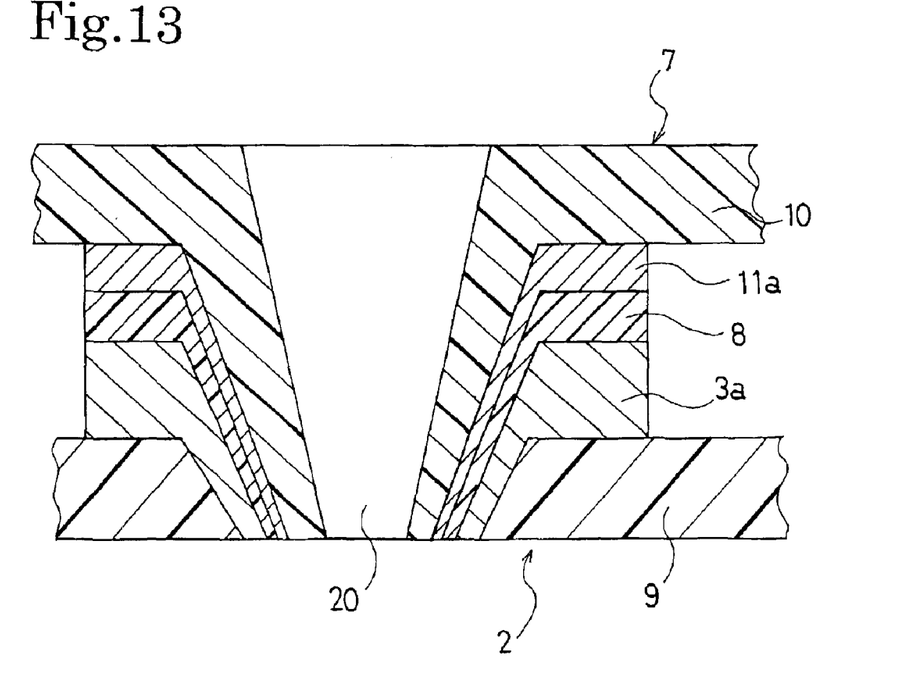
FIG. 13 is a vertical section showing still another mode of the deformation point of an electrode bonding part.

Though the molding tool press fitting to be performed in the electrodes deformation step is executed, in the aforementioned embodiment, by forcing the local point 20 of the enlarged electrode 11a, 11b of the interposer board 7 side into the antenna electrode 3a, 3b of the antenna circuit board 2 side, contrary to this, as shown in FIG. 10, the antenna electrode 3a, 3b of the antenna circuit board 2 side may also be forced in the enlarged electrode 11a, 11b of the interposer board 7 side. Moreover, it is sufficient that the press fitting deformation to be applied to the electrode per point, be at least one point, and may also be a plurality of positions as shown in FIG. 11. And, the place of press fitting is not limited to the central portion of the electrode, but it may be the peripheral portion. Besides, the shape of bend deformation is not limited to a V shape shown in FIGS. 8, 10, 11, but it may be, for instance, a curved shape as shown in FIG. 12. Moreover, the bend deformation may be a press fitting into a penetrated state as shown in FIG. 13.

As mentioned hereinabove, in the noncontact ID card of the first invention of the present invention, as the antenna electrode of the antenna circuit board and the enlarged electrode of the interposer board are bonded with the electroconductive adhesive material and, further, the substrate of the antenna circuit board and the substrate of the interposer board are bonded, a stable electric resistance value can be kept satisfactory for a prolonged period of time, without being influenced by the environmental changes such as temperature and moisture even in case of using the electroconductive adhesive material for bonding between the antenna electrode of the antenna circuit board and the enlarged board of the interposer board.

Besides, in the noncontact ID card of the second invention, the applyment of local deformation in at least one place of more of the bonding face of the antenna electrode of the antenna circuit board and the enlarged electrode of the interposer board in a direction crossing the bonding face permits to prevent the bonding part from detaching and, at the same time, prevent a relative dislocation between both electrodes, and maintain satisfactory the electric conduction state between both electrodes for a prolonged period of time even if the electroconductive adhesive material is used for bonding between the antenna electrode of the antenna circuit board and the enlarged board of the interposer board.

What is claimed is:

1. A noncontact ID card composed by laminating an antenna circuit board where an antenna is formed and an interposer board formed by connecting an enlarged electrode to an electrode of a mounted IC chip, bonding between an antenna electrode of said antenna circuit board and the enlarged electrode of said interposer board with electroconductive adhesive material and bonding between a substrate of said antenna circuit board and a substrate of said interposer board, wherein:

the substrate of said interposer board is made of at least a resin film, said resin film is made of thermoplastic resin, and the substrate of said antenna circuit board and the substrate of said interposer board are bonded by heat-welding.

2. The noncontact ID card of claim 1, wherein said IC chip is embedded in said resin film.

3. The noncontact ID card of claim 1, wherein said electroconductive adhesive material is made of an electroconductive sticky film.

4. The noncontact ID card of claim 1, wherein said enlarged electrode is made of electroconductive resin.

5. The noncontact ID card of claim 1, wherein the substrate of said antenna circuit board is made of at least a resin film.

6. The noncontact ID card of claim 5, wherein said resin film is made of thermoplastic resin.

* * * * *